United States Patent [19]

Muto et al.

[11] 4,425,053

[45] Jan. 10, 1984

[54] OIL FENCE ARRANGEMENT

[75] Inventors: Ikuo Muto, Tokyo; Masamitsu Tatsuguchi, Yoshikawa, both of Japan

[73] Assignee: Mitsui Ocean Development & Engineering Co., Ltd., Tokyo, Japan

[21] Appl. No.: 271,992

[22] Filed: Jun. 9, 1981

Related U.S. Application Data

[63] Continuation-in-part of Ser. No. 046,262, Jun. 7, 1979, abandoned.

[30] Foreign Application Priority Data

Aug. 9, 1978 [JP] Japan .................................. 53-96077

[51] Int. Cl.³ ........................................... E02B 15/04
[52] U.S. Cl. ...................................... 405/63; 405/66; 405/70

[58] Field of Search ...................... 405/63, 66, 70, 71, 405/72; 210/242.3, 923

[56] References Cited

U.S. PATENT DOCUMENTS

| 3,638,430 | 2/1972 | Smith | 405/66 |
| 3,867,817 | 2/1975 | Aramaki et al. | 405/72 X |
| 3,959,136 | 5/1976 | Ayers et al. | 210/242.3 X |
| 4,174,185 | 11/1979 | Toki | 405/63 X |

Primary Examiner—David H. Corbin
Attorney, Agent, or Firm—Hammond & Littell, Weissenberger and Muserlian

[57] ABSTRACT

An oil fence arrangement for effectively preventing oil spills from spreading or diffusing over the surface of the sea. The arrangement is of a double wall construction and can fold into a small space.

1 Claim, 10 Drawing Figures

OIL FENCE ARRANGEMENT

CROSS-REFERENCE TO RELATED APPLICATIONS

This patent application is a continuation-in-part of copending U.S. patent application Ser. No. 046,262, filed June 7, 1979, now abandoned.

STATE OF THE ART

This invention relates to the control of oil pollution on the sea, and more particularly to an oil fence arrangement for preventing oil spills from spreading or diffusing over the water surface.

Very often pollution of the oceans by oil, for example, oil spills from ships or oil tankers, is caused by shipwreck in a stormy sea. In order to collect the oil spills from the surface of the sea, it is essential to prevent oil spills from spreading or diffusing over the sea surface.

In the past, for this purpose a single wall oil fence arrangement consisting of float members and skirts or barrier walls which are suspended from the float member has been conventionally used. In such a conventional oil fence arrangement, however, there is a disadvantage that even if the sea surface oil spill is surrounded by the oil fence arrangement, the fence has a tendency to incline due to the action of hydrodynamic forces of waves or currents on the fence so as to permit the oil spill to escape under the lower edge of the fence.

OBJECTS OF THE INVENTION

In the light of the foregoing, a principal object of the present invention is to provide an oil fence arrangement which is capable of preventing oil spills from spreading over the surface of the sea regardless of the influence of the action of hydrodynamic forces of waves or currents on the oil fence arrangement.

Another object of the present invention is to provide an oil fence arrangement in the form of a double wall to be adapted for towing with tugboats and the like, to surround oil spills on the surface of the sea whereupon the oil can be pumped by means of oil collecting apparatus.

A further object of the present invention is to provide an oil fence arrangement which is capable of folding to reduce the space occupied by the arrangement when the oil fence arrangement is stored.

OUTLINE OF DRAWINGS

The above and other objects and features of the invention will more fully appear from the following detailed description when the same is read in connection with the accompanying drawings, in which.

DESCRIPTION OF THE INVENTION

Figure 1:
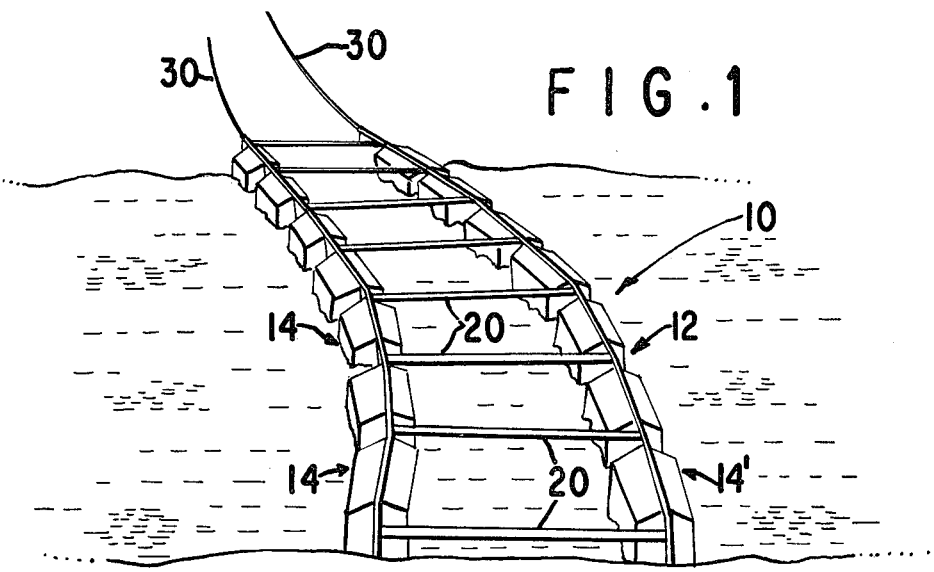
FIG. 1 is a perspective view of a portion of an oil fence arrangement consisting of a series of oil fence units according to the invention.
Figure 2:
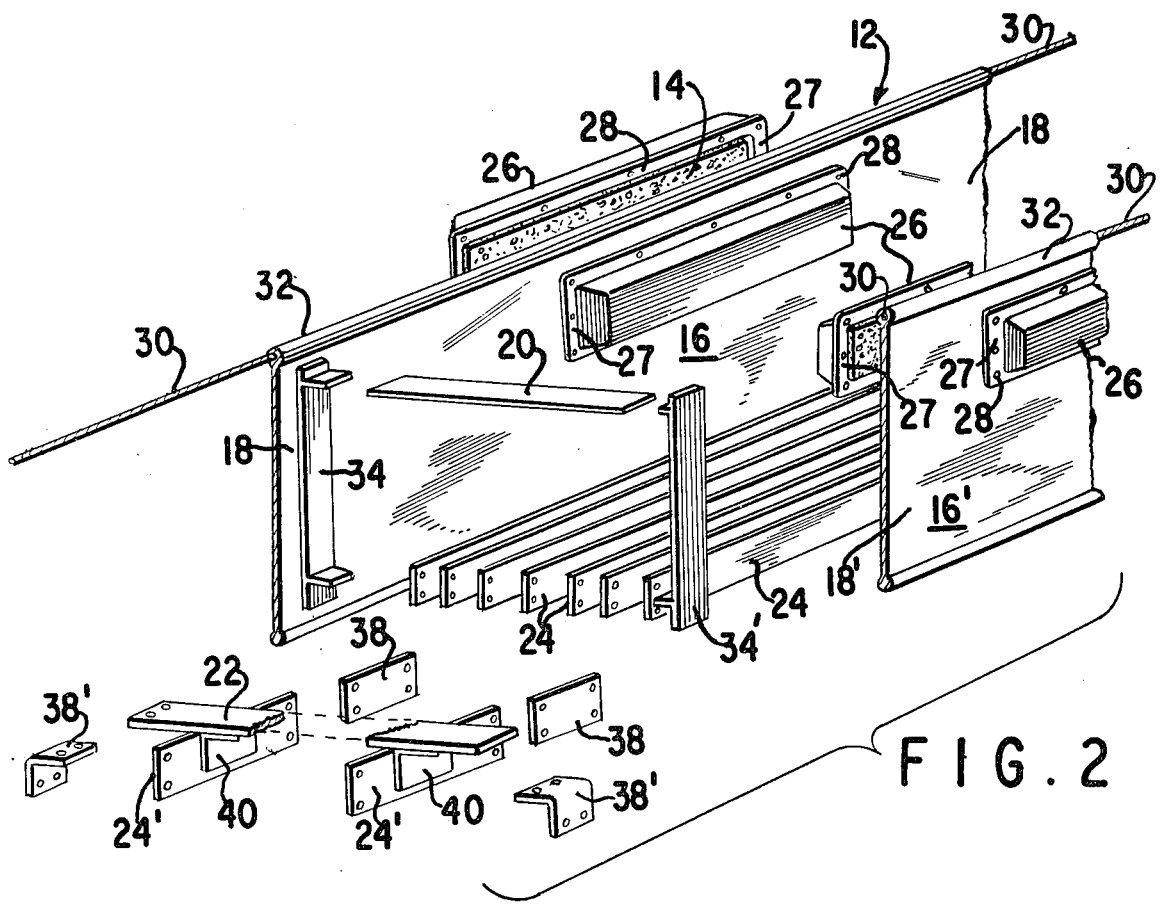
FIG. 2 is an exploded view of an embodiment of the oil fence arrangement set in the area.
Figure 3:
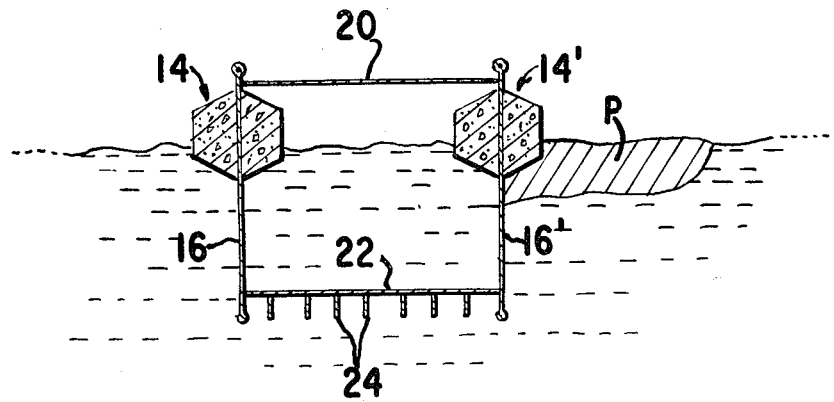
FIGS. 3 and 5 are cross-sectional views of the oil fence arrangement to help explain the condition in which hydrodynamic forces act on the oil fence arrangement of the present invention.

Referring now in detail to the accompanying drawings, in FIG. 1 there is shown a portion of a preferred embodiment of an oil fence arrangement 10 consisting of a series of fence units 12. As shown in FIG. 2, each of units 12 consists of a pair of float members 14 and 14'; flexible skirt members 16 and 16', which are respectively extended downwardly from each of the float members 14 and 14'; flexible connecting portions 18 and 18' for connecting between the float members 14 and 14 or 14' and 14' and between the skirt members 16 and 16 or 16' and 16' at a desired distance in longitudinal direction; upper spacing members 20 and lower spacing members 22 for connecting between the opposite flexible connecting portions 18 and 18' at a predetermined distance; and a plurality of deflecting plates 24 arranged between the lower spacing members 22.

The float member 14 is made of buoyant material such as polyethylene foam, and is fixed by a suitable means to a side or both sides of the skirt member 16 or 16'. For this purpose, for example, the float member 14 is housed in a flanged cover 26 and the flange 27 of the cover 26 may be fixed by suitable means 28, such as one or more threaded pins, to the skirt member 16 or 16'.

The skirt member 16 or 16' is made of flexible and tough sheet material which is impervious to liquid, and may be made from, for example, such as a neoprene coated sheet. The upper edge of the skirt member 16 or 16' may be in the form of a hollow edge portion 32 so that a rope 30 can be inserted for towing the arrangement.

The flexible connecting portion 18 or 18' adapted to connect the units may be formed by the extension of the skirt member 16 or 16'. The upper and lower spacing members 20 and 22 are provided between the flexible connecting portions 18 and 18'.

In the embodiment of the present invention shown in FIG. 2, a supporting member 34 or 34' extending from the upper end of the flexible connecting portion 18 or 18' to the lower end thereof is fixed to the connecting portion 18 or 18' by suitable fixing means such as bolts and nuts.

Figure 4:
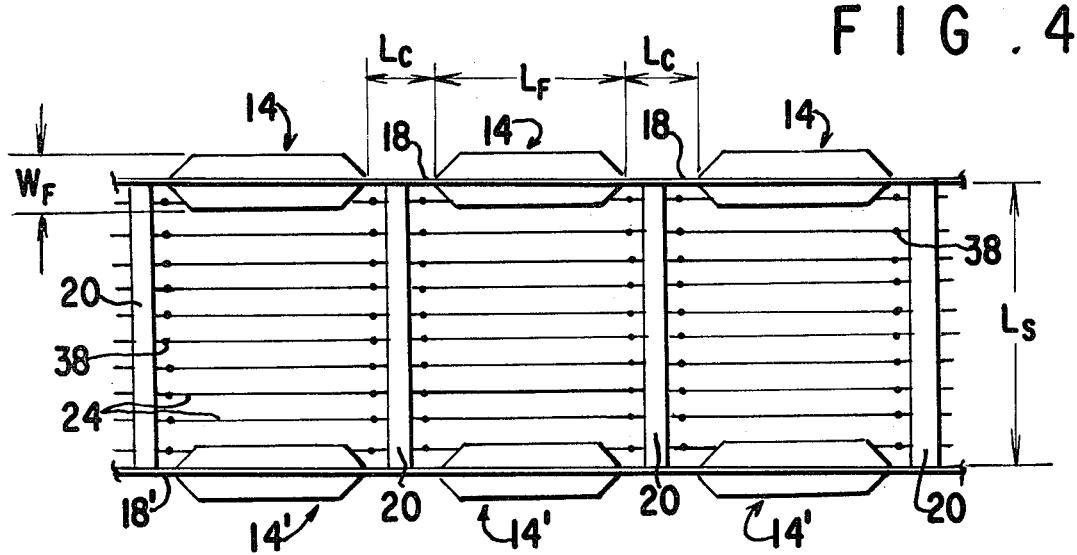
FIG. 4 is a top view of FIG. 3.
Figure 4A:
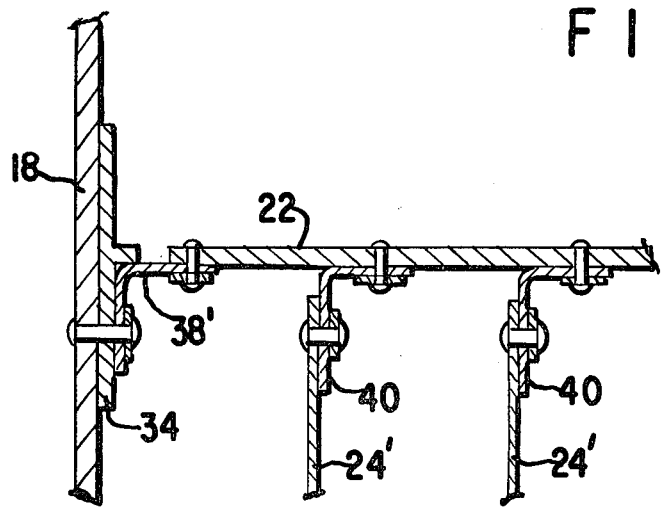
FIG. 4A is a partial sectional view showing a connection between a spacing member and deflecting plates.
Figure 4B:
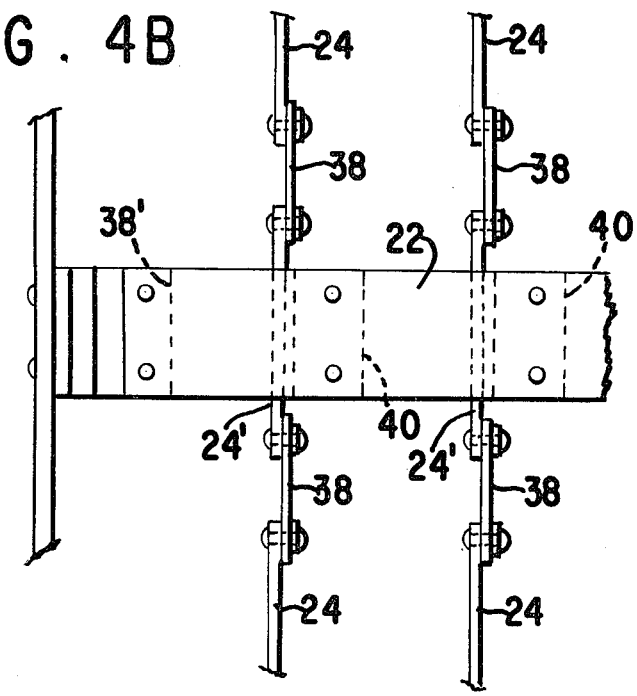
FIG. 4B is a top view showing a connection between a spacing member and deflecting plates.

A plurality of deflecting plates 24 are flexibly attached to the lower spacing members 22 by means of hinges 38 which are made of a flexible sheet material, and, as shown in FIGS. 4A and 4B, one end of the flexible sheet is fixed to a plate 24' which is fixed to the lower spacing member 22 by means of L-like member 40 welded or bolted to the lower spacing member 22 suitable joint means such as bolts and nuts or the like and the other end of the flexible sheet is fastened to the deflecting plate 24 in the same manner as mentioned above. The deflecting plates may be extended parallel to each other and to the skirt members 16 and 16' when the arrangement is set in the sea. As is also shown in FIGS. 4A and 4B, a similar flexible sheet, i.e., hinge 38', connects each end of spacing member 22 to supporting member 34 and connecting portion 18, or supporting member 34' and connecting portion 18', respectively.

As explained above, the oil fence arrangement 10 of the invention may be constructed to a desired length to surround the area of the oil spill on the surface of the sea by connecting a number of units 12.

Figure 6:
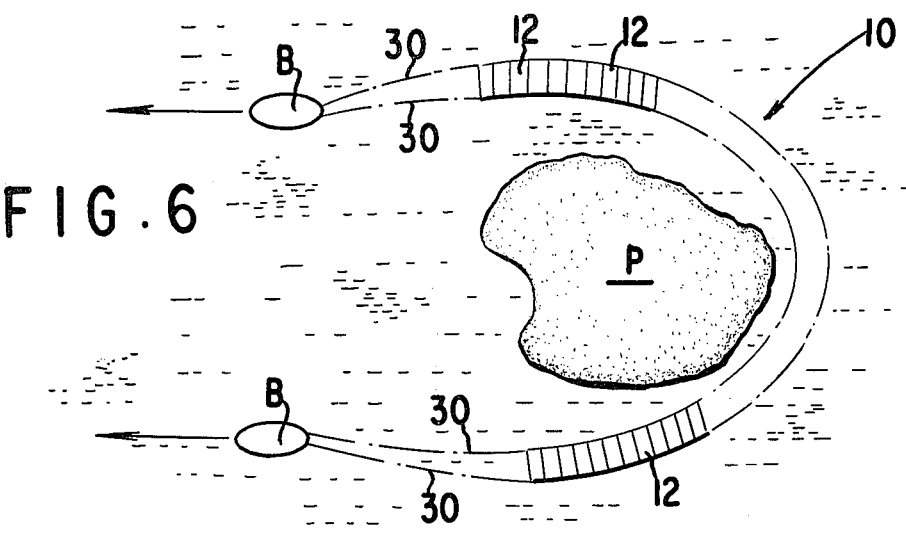
FIGS. 6 and 7 are each a schematic view of the oil fence arrangement as it is towed by tubboats.

In using the oil fence arrangement 10 of the present invention, as shown in FIG. 6, a plurality of oil fence units 12 are connected to each other to surround the area of oil spills P on the sea, and the arrangement may be towed with ropes 30 by means of tugboats B and the like.

Figure 7:
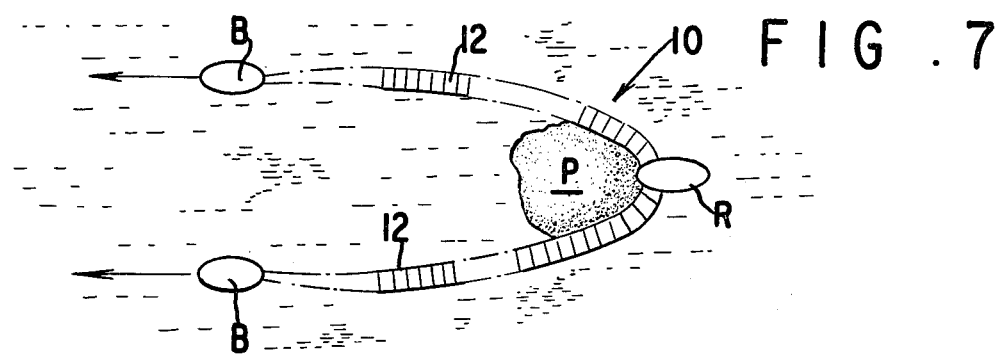

Thus, as shown in FIG. 7, by towing a desired length of the oil fence arrangement 10 by tugboats B with ropes 30 which are connected to the arrangement and providing a suitable oil recovering apparatus, which is well known in the art, to a suitable portion of the arrangement, the oil spill may be collected by the arrangement and pumped from the sea by the oil recovering apparatus.

When the arrangement 10 is set in the sea, the float members 14 and 14' will float on the surface of the sea, and the skirt members 16 and 16' connected to the float members will be suspended into the sea in the form of double barrier. Accordingly, the oil spill P may be surrounded with an inside fence or skirt.

Figure 5:
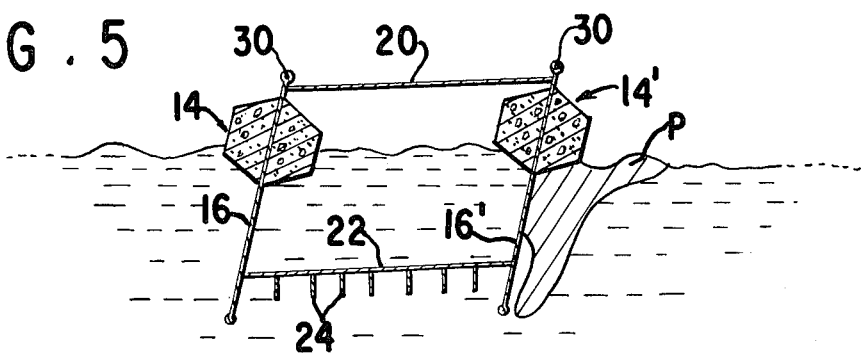

On the other hand, even if the oil fence 10 is inclined as shown in FIG. 5 under the effect of the hydrodynamic forces of waves or currents acting on the oil fence arrangement, the inner and outer skirt members may be maintained in parallel, and the oil spill on the sea surface surrounded by the inner skirt will be led along the inner skirt and passed under a lower edge of the inner skirt 16'. Then the oil spill will rise on the surface between the inner skirt 16' and the outer skirt 16, and the oil spill may be prevented from spreading outwardly past the arrangement 10.

In this case, the deflecting plates 24 provided between lower spacing members 22 especially serve to prevent the oil flow from passing below the lower edge of the outer skirt member 16 to the outside and suppress the motion of the sea water in the area between the inner and outer skirt members 16 and 16', and therefore the oil spill should rise to the surface between the inner and outer skirt members 16' and 16. Thus the oil spill may be prevented from spreading past, or over, the skirt member 16.

In the oil fence arrangement of the present invention, the connecting portion 18 and the spacing members 20 and 22 have certain length characteristics. More specifically, the length of a connecting portion 18, that is, the longitudinal distance $L_c$ between adjacent float members 14 and 14 is longer than the width $W_F$ of a float member 14, and the length $L_s$ of a spacing member 20 or 22 is substantially longer than the length $L_F$ of a float member 14.

Figure 8:
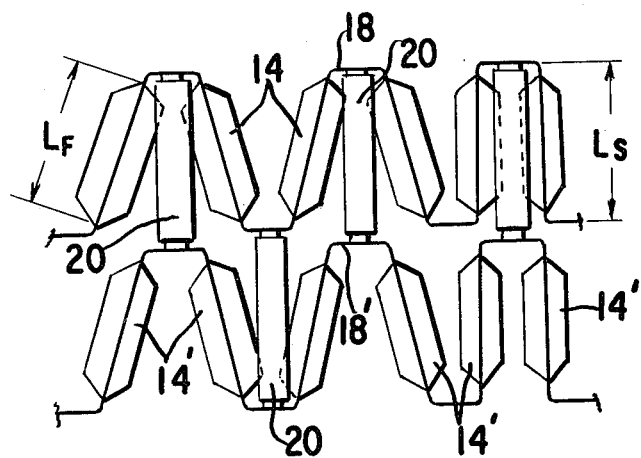
FIG. 8 shows a schematic view of the oil fence arrangement which has been folded into a small size.

Thus, it is possible to fold the oil fence arrangement 10 of the invention at the connecting portion of each unit. Namely, as is shown in FIG. 8, if the arrangement is folded at the flexible portion between a float member 14 and a connecting portion 18, the adjacent float members 14 and 14' of the outer and inner rows of the arrangement may be folded in two, because of the length $L_c$ of the connecting portion 18 or 18' is longer than the width $W_F$ of the float member 14 or 14' and the length $L_s$ of the upper or lower spacing member 20 or 22 is longer than the length $L_F$ of the float member 14.

Furthermore, as the deflecting plate 24 is hinged at 38 to the lower spacing member 22, the folding of the arrangement may be effected without any difficulty. Accordingly, in storing the arrangement 10, the arrangement may be folded without division into individual units. Therefore, the folded arrangement may be loaded on a tugboat or moored in the sea in a small space.

The preceding specific embodiments are illustrative of the practice of the invention. It is to be understood, however, that other expedients known to those skilled in the art or disclosed herein, may be employed without departing from the spirit of the invention or the scope of the appended claims.

What is claimed is:

1. An oil fence unit comprising a pair of oppositely positioned inner and outer float members:

an outer skirt member extending downwardly from said outer float member;

an inner skirt member extending downwardly from said inner float member for surrounding oil spills on the sea surface and to guide them to the lower edge of said inner skirt member in accordance with the inclination thereof under the effect of the hydrodynamic forces of the sea water;

a flexible connecting portion provided to at least one end of each of said outer and inner skirt members to connect one oil fence unit to another in a longitudinal direction at a predetermined distance therebetween;

the length of said flexible connecting portion being greater than the width of said float member;

upper and lower spacing members to separate said outer and inner float members and skirt members at a predetermined distance;

said spacing member being fixed to said flexible connecting portion and the length of each of said spacing member being greater than the length of said float member;

and a plurality of deflecting plates hinged to said lower spacing member to be positioned in parallel to said skirt members for floating oil spills in the underside of said inner skirt member up to the sea surface between said outer and inner skirt members without the influence of the motion of the sea;

whereby oil spills may be collected in a space between said outer and inner float members and skirt members and, when a number of oil fence units are connected, the connected oil fence units are capable of being folded up without removing and separating any members.

* * * * *